United States Patent
Dobler

(10) Patent No.: US 11,932,757 B2
(45) Date of Patent: Mar. 19, 2024

(54) FORMALDEHYDE FREE SAFE TO USE BINDER FORMULATION FOR WOVEN, NONWOVEN AND GRANULAR MATERIALS

(71) Applicant: Trinseo Europe GmbH, Horgen (FR)

(72) Inventor: Francis Marcel Joseph Dobler, Drusenheim (FR)

(73) Assignee: Trinseo Europe GmbH (FR)

( * ) Notice: Subject to any disclaimer, the term of this patent is extended or adjusted under 35 U.S.C. 154(b) by 132 days.

(21) Appl. No.: 17/277,957

(22) PCT Filed: Oct. 4, 2019

(86) PCT No.: PCT/EP2019/076903
§ 371 (c)(1),
(2) Date: Mar. 19, 2021

(87) PCT Pub. No.: WO2020/070283
PCT Pub. Date: Apr. 9, 2020

(65) Prior Publication Data
US 2021/0355315 A1  Nov. 18, 2021

Related U.S. Application Data

(60) Provisional application No. 62/741,140, filed on Oct. 4, 2018.

(51) Int. Cl.
| | |
|---|---|
| *C08L 63/04* | (2006.01) |
| *C08J 5/24* | (2006.01) |
| *C08L 19/02* | (2006.01) |
| *D03D 25/00* | (2006.01) |
| *D04H 1/64* | (2012.01) |
| *D04H 3/12* | (2006.01) |

(52) U.S. Cl.
CPC ............... *C08L 63/04* (2013.01); *C08J 5/247* (2021.05); *C08L 19/02* (2013.01); *D03D 25/00* (2013.01); *D04H 1/64* (2013.01); *D04H 3/12* (2013.01); *C08J 2319/02* (2013.01); *C08J 2363/04* (2013.01); *C08L 2201/52* (2013.01)

(58) Field of Classification Search
None
See application file for complete search history.

(56) References Cited

U.S. PATENT DOCUMENTS

| | | | |
|---|---|---|---|
| 4,913,972 A * | 4/1990 | Grunewalder | C08L 97/02 427/325 |
| 6,166,127 A * | 12/2000 | Tomko | C08G 18/672 524/507 |
| 6,475,615 B2 * | 11/2002 | Porter | C09D 175/16 428/335 |
| 2005/0048212 A1 * | 3/2005 | Clamen | D06M 13/192 427/384 |
| 2011/0214796 A1 | 9/2011 | Avramidis et al. | |
| 2014/0187672 A1 * | 7/2014 | Zhao | C08K 5/47 524/92 |
| 2014/0348776 A1 * | 11/2014 | Palmer, Jr. | C08L 95/00 428/35.8 |
| 2017/0029669 A1 | 2/2017 | Obert et al. | |

FOREIGN PATENT DOCUMENTS

| | | |
|---|---|---|
| EP | 1510618 A1 | 3/2005 |
| WO | 2007/149644 A1 | 12/2007 |
| WO | 2010/088321 A1 | 8/2010 |

OTHER PUBLICATIONS

International Search Report issued in PCT/EP2019/076903 dated Jan. 2, 2020.
Written Opinion of the International Searching Authority issued in PCT/EP2019/076903 dated Jan. 2, 2020.
International Preliminary Report on Patentability issued in PCT/EP2019/076903 dated Mar. 23, 2021.

* cited by examiner

*Primary Examiner* — Megan McCulley
(74) *Attorney, Agent, or Firm* — BARNES & THORNBURG LLP; Scott D. Rothenberger

(57) ABSTRACT

Binder compositions that are formaldehyde free and include a latex emulsion, an epoxysilane, an epoxy dispersion, a polyol or a latex emulsion, a styrenic copolymer having carboxylic acid functionality, an epoxysilane or an epoxy dispersion or a mixture of both, a polyol and, optionally, an additive, wherein the composition does not comprise formaldehyde are described.

10 Claims, No Drawings

FORMALDEHYDE FREE SAFE TO USE BINDER FORMULATION FOR WOVEN, NONWOVEN AND GRANULAR MATERIALS

CROSS REFERENCE TO RELATED APPLICATIONS

This application claims the benefit of U.S. Provisional Ser. No. 62/741,140, filed Oct. 4, 2018, the contents of which are expressly incorporated herein by reference for all purposes.

FIELD OF THE INVENTION

The invention relates generally to compositions of a latex, a polyol, an epoxy silane and an epoxy dispersion or a latex, a polyol, an epoxy silane and/or an epoxy dispersion and a styrenic copolymer with carboxylic acid functionality.

BACKGROUND OF THE INVENTION

Textile fabrics, in particular those which are used as lining material for the manufacture of coated materials, have to meet various requirements. Examples of the use of such lining materials are, among others, textile backings for carpets, textile reinforcements in PVC floorings or roofing sheets.

Typically, binders are used to help strengthen and/or agglomerate the material into a useful product for various applications. However, most binder formulations include melamine formaldehyde and/or urea formaldehyde resins as external crosslinkers and which tend to include, produce and/or release formaldehyde as a byproduct. Formaldehyde poses a significant danger to human health as it is toxic and is a known as a human carcinogen.

Therefore, a need exists for a binder resin/composition that overcomes one or more of the current disadvantages noted above.

BRIEF SUMMARY OF THE INVENTION

The present embodiments surprisingly provide a formaldehyde free composition comprising a latex, an epoxysilane, an epoxy dispersion, a polyol and, optionally, an additive, wherein the composition does not comprise formaldehyde.

In another aspect, the embodiments provide a formaldehyde free composition comprising a latex, a copolymer having carboxylic acid functionality, an epoxysilane or an epoxy dispersion or a mixture of both, a polyol and, optionally, an additive, wherein the composition does not comprise formaldehyde or formaldehyde releasing components.

The compositions are useful as binders for synthetic fibers, mineral fibers, cellulosic fibers or any combination thereof, wovens, nonwovens and/or granular particulates.

While multiple embodiments are disclosed, still other embodiments of the present invention will become apparent to those skilled in the art from the following detailed description. As will be apparent, the invention is capable of modifications in various obvious aspects, all without departing from the spirit and scope of the present invention. Accordingly, the detailed descriptions are to be regarded as illustrative in nature and not restrictive.

DETAILED DESCRIPTION

In the specification and in the claims, the terms "including" and "comprising" are open-ended terms and should be interpreted to mean "including, but not limited to . . . ." These terms encompass the more restrictive terms "consisting essentially of" and "consisting of."

It must be noted that as used herein and in the appended claims, the singular forms "a", "an", and "the" include plural reference unless the context clearly dictates otherwise. As well, the terms "a" (or "an"), "one or more" and "at least one" can be used interchangeably herein. It is also to be noted that the terms "comprising", "including", "characterized by" and "having" can be used interchangeably.

Unless defined otherwise, all technical and scientific terms used herein have the same meanings as commonly understood by one of ordinary skill in the art to which this invention belongs. All publications and patents specifically mentioned herein are incorporated by reference in their entirety for all purposes including describing and disclosing the chemicals, instruments, statistical analyses and methodologies which are reported in the publications which might be used in connection with the invention. All references cited in this specification are to be taken as indicative of the level of skill in the art. Nothing herein is to be construed as an admission that the invention is not entitled to antedate such disclosure by virtue of prior invention.

The following sections will describe the components of the various components utilized in the embodiments detailed throughout the specification.

Latexes

The polymer latex utilized herein can be prepared from a monomer mixture which contains one or more ethylenically unsaturated monomers (e.g., ethylenic aromatics such as styrenes, etc., acrylates and methacrylates) and, optionally, one or more conjugated diene monomers, and which may optionally contain further polymerizable monomers (also referred to as comonomers) such as monofunctional or multifunctional acrylic and methacrylic acids and corresponding acrylate and methacrylate monomers.

The one or more ethylenically unsaturated aromatic monomers are typically used in a total amount of 10 to 90 wt %, more particularly 25 to 75 wt %, even more particularly 30 to 70 wt %, based on the total amount of monomers (including comonomers). Representative ethylenically unsaturated aromatic monomers include, for example, styrene, alpha-methyl styrene, p-ethyl styrene, p-methyl styrene, tert-butyl styrene, vinyl toluene and $C_{1-4}$ alkyl, chloro and bromo derivatives thereof. In particular, the ethylenically unsaturated monomer can be styrene, acrylic acid or methacrylic acid.

The optional one or more conjugated diene monomers are typically used in a total amount of 0 to 80 wt %, more particularly 20 to 80 wt %, even more particularly 20 to 70 wt %, even more particularly 25 to 60 wt %, based on the total amount of monomers. Representative conjugated diene monomers include, for example, 1,3-butadiene, isoprene, 2-methyl-1,3-butadiene, 2,3-dimethyl-1,3-butadiene and chlorinated butadiene. A particular conjugated diene monomer is 1,3-butadiene (also abbreviated as butadiene).

Further polymerizable monomers (comonomers) may be used as monomers to be polymerized in the preparation of the polymer latex of the present invention. Two or more of such further comonomers may be used in combination.

Examples of such comonomers include acrylate monomers, and two or more acrylate monomers may be used in combination. Representative examples of the acrylate monomers include, for example, n-, iso- and alkyl esters of acrylic or methacrylic acid, wherein the alkyl group has from 1 to 20 carbon atoms. Additionally, acrylate monomers can include acids, esters, amides of the (meth)acrylic acid, and substituted derivatives thereof. Generally, acrylate monomers are $C_1$-$C_{20}$ alkyl(meth)acrylates and $C_1$-$C_{10}$ alkoxy $C_1$-$C_{10}$ alkyl (meth)acrylates, more particularly $C_1$-$C_8$ alkyl (meth)acrylates and $C_1$-$C_8$ alkoxy $C_1$-$C_8$ alkyl(meth)acrylates. Examples of such acrylate monomers include n-butyl acrylate, sec-butyl acrylate, ethyl acrylate, hexyl acrylate, tert-butyl acrylate, 2-ethylhexyl acrylate, iso-octyl acrylate, 4-methyl-2-pentyl acrylate, 2-methylbutyl acrylate, methyl methacrylate, butyl methacrylate, n-butyl methacrylate, isobutyl methacrylate, ethyl methacrylate, isopropyl methacrylate, hexyl methacrylate, cyclohexyl methacrylate, and cetyl methacrylate, methoxyethyl methacrylate, ethoxyethyl methacrylate, methoxyethyl acrylate, ethoxyethyl acrylate, butoxyethyl methacrylate, methoxybutyl acrylate and methoxyethoxyethyl acrylate. Preferred acrylate monomers are n-butyl acrylate, butyl methacrylate, 2-ethylhexyl acrylate, methyl acrylate and methyl methacrylate, with methyl methacrylate and n-butyl acrylate being especially preferred. Typically, the amount of acrylate monomer (if used) will be from 0 to 70 wt %, in particular from 0 to 60 wt %, even more particularly from 0 to 50 wt %, based on the total amount of the monomers.

Further examples of such comonomers include ethylenically unsaturated mono- and di-carboxylic acid monomers such as (meth)acrylic acid, fumaric acid, maleic acid, maleic anhydride and itaconic acid, nitrile monomers, hydroxyalkyl-(meth)acrylate monomers, alkoxyalkyl(meth)acrylate monomers, and (meth)acrylamide monomers. It should be understood that none of the polymerizable monomers contain a functional group (such as a methylol) that could release formaldehyde. It should be understood that the latex includes at least one ethylenically unsaturated monomer which includes at least one of a carboxylic acid, an amine or a hydroxyl functionality or mixtures thereof.

Additional suitable comonomers include acrylonitrile and/or vinyl ester monomers.

Further comonomers useful in the present invention are crosslinkers and include crosslinkable monomers, such as multi-ethylenically unsaturated monomers. Exemplary crosslinkers include glycidyl acrylate, glycidyl methacrylate, ethylene glycol dimethacrylate, allyl methacrylate, diallyl maleate, propylene glycol dimethacrylate, divinylbenzene; and acryloxy alkylsilanes, such as, for example, alpha-acryloxypropyl trimethoxysilane. Particular crosslinkable monomers for use in the present invention are allyl methacrylate, glycidyl methacrylate, and acryloxy alkylsilanes. These crosslinkable monomers, if used, are typically employed at levels of from 0.05 to 10 wt %, more particularly from 0.05 to 5 wt %, more particularly 0.05 to 2 wt %, based on the total amount weight of monomers.

Initiators useful in the practice of the present invention include water-soluble and/or oil-soluble initiators which are effective for purposes of polymerization. Representative initiators are well-known in the art and include, for example, thermal initiators that are oil-soluble, such as higher alkyl peroxides or azo compounds or thermal initiators which are water-soluble such as persulfate; redox pairs including sodium sulfite, sodium bisulfite, sodium metabisulfite or and persulfate salt, ferrous ions and a peroxide (Fenton's reagent), cuprous ions and peroxide, and ferrous ions and sodium persulfate wherein the peroxides can include benzoyl peroxide, hydrogen peroxide, or t-butyl peroxide. Examples of oil-soluble thermal initiators are azobisisobutyronitrile and t-butyl peroctoate. The initiator is employed in an amount sufficient to initiate the polymerization reaction at a desirable rate. In general, the amount of initiator will range from 0.05 to 5, particularly 0.1 to 4 wt %, more particularly from 0.1 to 3 wt %, based on the total amount of the monomers.

In a one embodiment, the process of the present invention does not employ a redox pair as an initiator.

Surfactants or emulsifiers suitable for use in the present invention include those conventional surface active agents typically known in the art for polymerization processes. The surfactant(s) can be added to the aqueous phase and/or monomer phase. An effective amount of surfactant in a seeded process is that amount selected to assist in stabilizing the particle as a colloid, minimizing contact between the particles and preventing coagulation. In an unseeded process, an effective amount of surfactant will be that amount selected to influence the particle size.

Representative surfactants include saturated and ethylenically unsaturated sulfonic acids or salts thereof, including, for example, hydrocarbon sulfonic acids, such as, vinyl sulfonic acid, allyl sulfonic acid, and methallyl sulfonic acid, and salts thereof; aromatic hydrocarbon-sulfonic acids, such as, for example, p-styrene sulfonic acid, isopropenyl benzene sulfonic acid, and vinyloxybenzene sulfonic acid, and salts thereof; sulfoalkyl esters of acrylic acid and methacrylic acid, such as, for example, sulfoethyl methacrylate and sulfopropyl methacrylate and salts thereof; and 2-acrylamido-2-methylpropanesulfonic acid and salts thereof; alkylated diphenyl oxide disulfonates, sodium dodecyl benzene sulfonates and dihexyl esters of sodium sulfosuccinic acid, ethoxylated alkyl phenols and ethoxylated alcohols; and sulfosuccinate ester salts, alkylethoxylated sulfate and alkylethoxylated sulfonate salts, alkyl (poly)phosphate salts, and alkyl sulfate and alkyl sulfonate salts.

The type and concentration of surfactant is typically dependent on the polymer solids level and latex particle size. A higher polymer solids level and a low particle size will generally increase the need for surfactant. Typically, surfactants are employed in a total amount of from 0.05 to 20, particularly from 0.05 to 10, more particularly from 0.05 to 5, parts by weight, based on the total weight of the monomers.

Various other additives and ingredients known to those skilled in the art can be incorporated to prepare the latex polymer or latex polymer composition of the present invention. Such additives include, for example, metal chelating agents, pH buffering agents, anti-foaming agents, wetting agents, thickeners, plasticizers, fillers, pigments and antioxidants. Known anti-foaming agents include silicon oils, polysiloxane oils, acetylene glycols, mineral oils and paraffinic oils and formulated compounds. Common known wetting agents include alkylphenol ethoxylates, alkali metal dialkyl sulfosuccinates, acetylene glycols and alkali metal alkyl sulfates. Typical thickeners include polyacrylates, polyacrylamides, xanthan gums, modified celluloses or particulate thickeners such as silicas and clays. Typical plasticizers include mineral oil, liquid polybutenes, liquid polyacrylates and lanolin. Zinc oxide, titanium dioxide, aluminum hydrate, calcium carbonate, and clay are typically employed as fillers.

The polymerization for producing the polymer latex can be generally run in the presence of a chain transfer agent, as the polymerization proceeds.

The total polymerization time, as referred to in this specification, represents the time from contacting the monomer mixture, or a part thereof, with initiator until the desired degree of polymerization is achieved. For example, in case the monomer mixture is continuously added to the reaction as the polymerization proceeds, the total polymerization time represents the time from beginning of the addition until termination of the addition, including the time of subsequent addition of initiator to achieve the desired degree of polymerization and or conversion.

In general, polymer latexes can be prepared by polymerization processes which are known in the art, and particularly by the known latex emulsion polymerization processes, including both seeded and unseeded latex polymerization. Representative processes include those described in U.S. Pat. Nos. 4,478,974, 4,751,111, 4,968,740, 3,563,946, 3,575,913, DE 1 905 256 and WO 2011/079011. Such processes can be adapted as necessary to polymerize the monomer mixture used in the present invention. The method of introduction of the monomer mixture and other ingredients, such as polymerization aids, is not particularly critical. The polymerization is then carried out under conventional conditions until the desired degree of polymerization is achieved. In general, the polymerization is carried out at a temperature of from 50 to 95° C., more particularly from 70 to 90° C. Crosslinkers and the well-known latex polymerization aids such as initiators, pH buffering agents, surfactants and emulsifiers can be used as needed.

Water Soluble Polycarboxylic Acid (Polymers)

Water soluble polycarboxylic acids (WSPAs) are useful with the present embodiments. WSPAs include at least 2 carboxylic acid groups with the molecule and more particularly 3 or more, including 10, 20, etc. through to hundreds of carboxylic acid groups depending on the molecular weight of the molecule. It should be understood that the carboxylic acid may also be in the form of an anhydride. Polyacrylic acid is a suitable WSPA, e.g, Dispex N40.

The molecular weight of suitable WSPAs can range from a molecular weight of 500 daltons to 150,000 daltons or more. More particularly a molecular weight of from about 25,000 to about 100,000, more particularly from about 5,000 to about 80,000. The molecular weight is noted as the weight average molecular weight of the polymer.

Suitable carboxylic acid containing monomers used in copolymers include, for example, acrylic acid, methacrylic acid, itaconic acid, fumaric acid and maleic acid and anhydrides.

The amount of carboxylic acid monomer present in a copolymer should be from about 10 wt % to about 80 wt % of the total weight of the copolymer. More particularly, the carboxylic acid content should be from about 15 wt % to about 60 wt %, from about 20 wt % to about 50 wt % and even more particularly from about 25 wt % to about 45 wt % and all percentages and ranges encompassing from about 10 wt % to about 80 wt % inclusive (e.g. 20 wt %, 30 wt %, 40 wt %, 50 wt %, 60 wt %, 70 wt %, 80 wt % and all percentages and ranges there between).

It should be understood that the carboxylic acid can be present as the acid (protonated form) or as a salt (deprotonated form) or as an anhydride. Suitable salts include, for example, amine salts, ammonium salts and alkaline metal salts.

Suitable comonomers used in the WSPAs can include, styrenic based monomers, alkyl acrylate esters, alkyl methacrylate esters, hydroxyalkyl acrylates and hydroxyalkyl/methacrylates.

In one aspect, a particularly preferred comonomer is maleic acid or maleic anhydride, used in an amount of at least 20 wt %, more particularly at least 25 wt %, even more particularly at least 40 wt %, e.g., at least 42 wt %. In terms of ranges, amounts are 20 to 60 wt %, more particularly 25 to 45 wt %, even more particularly 40 to 45 wt % and all percentages and ranges encompassing from about 20 wt % to about 60 wt % inclusive (e.g. 20 wt %, 30 wt %, 40 wt %, 50 wt %, 60 wt %, and all percentages and ranges there between).

In particular, the maleic acid or maleic anhydride is copolymerized with a vinyl styrenic component as noted above. A copolymer of styrene/maleic acid (or anhydride) (collectively used herein as "SMA") can be used in combination with another latex as described herein so that a latex and an SMA latex are both present in the composition.

In one embodiment of the present invention, the SMA polymer is prepared from at least styrene and maleic acid or maleic anhydride wherein the maleic acid and/or maleic anhydride are present in an amount of from 20 wt % to about 60 wt %, more particularly from 25 wt % to 50 wt %, even more particularly from 30 wt % to 45 wt %, and in particular from 35 wt % to 50 wt % of the wt % of the SMA polymer and all percentages and ranges encompassing from about 20 wt % to about 60 wt % inclusive (e.g. 20 wt %, 30 wt %, 40 wt %, 50 wt %, 60 wt % and all percentages and ranges there between).

Polyols

The term "polyol," as used herein, refers to a molecule that contains more than one hydroxyl group. A polyol may be a diol, triol, or a tetraol which contains 2, 3, and 4 hydroxyl groups respectively. A polyol also may contain more than 4 hydroxyl groups, such as a pentaol, hexaol, heptaol, or the like, which contain 5, 6, or 7 hydroxyl groups, respectively. Additionally, a polyol also may be a sugar alcohol, polyhydric alcohol, or polyalcohol which is a reduced form of carbohydrate, wherein the carbonyl group (aldehyde or ketone, reducing sugar) has been reduced to a primary or secondary hydroxyl group.

Suitable polyols include polyvinyl alcohol, partially acetylated polyvinyl alcohol, casein, starch, modified starch, such as dextrins, hydroxyethyl starch and the like, cellulose, carboxymethyl cellulose, hydroxyethyl cellulose, hydroxypropyl cellulose, gum Arabic, monosaccharides, disaccharides, oligosaccharides, polysaccharides (e.g., dextrins, starches, and edible gums as well as chitin and pectin).

Epoxides

The term "epoxide" is understood in the art and refers to a material that can react with a nucleophile, such as an amine or a carboxylate. Not to be limited by theory, it is believed that the latexes, WSPAs and polyols described herein provide amine, hydroxyl and/or carboxylic acid functionality suitable to react with an epoxide. Alternatively, a water soluble carboxylic acid polymer can react with an epoxide.

Epoxysilanes useful in regard to the first practice of the invention are of the general structure $R^1{}_aR^2{}_bSi(OR^3)_{4-a-b}$ where for the purposes of this formula, $R^1$ is an epoxy substituted alkyl or aralkyl group, where the alkyl or aralkyl group may have from four to thirty carbon atoms, $R^3$ is an alkyl or alkoxy-substituted alkyl, aryl or aralkyl group having from two to sixteen carbon atoms, $R^2$ is an alkyl group or alkoxy substituted alkyl, aryl or aralkyl group having from one to twenty carbon atoms, a is one to three, and b is zero to two, with the proviso that a+b is 1, 2, or 3. Each R group may be cyclic, branched or linear.

Epoxysilanes include, for example, those with the formulae:

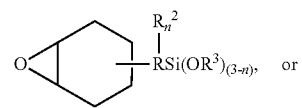

or

-continued

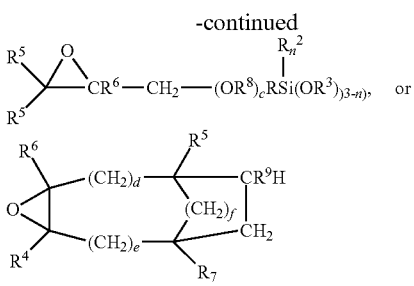

where:

R is $(CH_2)_m$, where m has a value of 0 to 6;

$R^2$ is a $C_1$-$C_{10}$ alkyl, optionally substituted with a $C_1$-$C_{10}$ alkoxy, or a $C_6$-$C_{10}$ aryl or a $C_7$-$C_{10}$ aralkyl group;

$R^3$ is a $C_2$-$C_6$ alkyl, optionally substituted with a $C_1$-$C_{10}$ alkoxy, or a $C_6$-$C_{10}$ aryl or a $C_7$-$C_{10}$ aralkyl group;

$R^4$, $R^5$, $R^6$ or $R^7$ are individually each hydrogen or a $C^1$-$C^6$ alkyl group;

$R^8$ is a $C_1$-$C_4$ alkylene group or a $C_7$-$C_{10}$ aralkylene or a $C_6$-$C_{10}$ arylene group;

$R^9$ is $RSi(R_n^2)(OR^3)_{3-n}$;

n is 0, 1 or 2;

c, d and e are each independently 0 or 1; and f is 0, 1 or 2.

Mixtures of epoxy silanes having the formulae described above may also be used.

$R^2$ denotes a substituted or unsubstituted monovalent hydrocarbon group exemplified by alkyl groups (e.g., methyl, ethyl, isobutyl, and octyl groups), alkenyl groups (e.g., vinyl and allyl groups), aryl groups (e.g., phenyl, tolyl and naphthyl groups), and aralkyl groups (e.g., benzyl and 2-phenylethyl groups), as well as those substituted groups obtained by the replacement of one or more of the carbon atoms in the above named hydrocarbon groups with various kinds of atoms and/or groups including sulfur and oxygen, and/or replacement of one or more of the hydrogen atoms in the above named hydrocarbon groups with various kinds of groups, including, but not limited to, halogen atoms, epoxy, methacryloxy, acryloxy, carboxyl, ester, cyano, and polyoxyalkylene groups.

$R^3$ are alkyl, alkoxyalkyl, aryl or aralkyl radicals such as ethyl, n-propyl, n-butyl, n-hexyl, n-heptyl, n-octyl, n-nonyl, n-decyl, and cycloalkyl radicals such as cyclopentyl, cyclohexyl, cycloheptyl, and cyclooctyl. Illustrative of suitable branched chain hydrocarbon radicals for $R^3$ are alkyl radicals such as isopropyl, isobutyl, sec-butyl, isobutyl, sec-amyl, and 4-methyl-2-pentyl. Alkoxyalkyl groups may be exemplified by n-butoxy ethyl and methoxy propyl. Aryl groups may be exemplified by phenyl and aralkyl groups may be exemplified by benzyl or ethyl phenyl.

$R^4$, $R^5$, $R^6$ or $R^7$ are each, individually, hydrogen atoms or monovalent hydrocarbon groups having 1 to 6 carbon atoms exemplified by alkyl groups (e.g., methyl, ethyl, propyl, isopropyl, n-butyl and isobutyl groups), alkenyl groups (e.g., vinyl and allyl groups), and aryl groups (e.g., phenyl group). These hydrocarbon groups may be substituted by halogen atoms and functional groups, including cyano and epoxy, for a part or all of the hydrogen atoms therein.

Examples of epoxysilanes used in accordance with the present invention include, but are not limited to, those silanes described by Brison and Lefort in French Patent No. 1,526,231. Specific examples are 2-(3,4-epoxycyclohexyl) ethyltriethoxysilane, 4-(methyldiethoxysilyl)-1,2-epoxycyclohexane, 3-(3,4-epoxycyclohexyl)propyltri-(isobutoxy)silane, 3-(2,3-epoxybutoxy)propyltriethoxysilane, and [2.2.1] bicycloheptane 2,3-epoxy-5-(2-triethoxysilyl)ether and mixtures thereof.

In one aspect, the epoxysilane comprises a glycidoxy silane.

Suitable glycidoxy silanes include for example, but are not limited to, gamma-glycidoxypropyl trimethoxysilane, gamma-glycidoxypropyl triethoxysilane, gamma-glycidoxypropyl methyldimethoxysilane, or gamma-glycidoxypropyl methyldiethoxysilane (e.g., CoatOSil 2287, Momentive Performance Materials) and mixtures thereof.

In another aspect, the embodiments disclosed herein include an epoxycyclohexyl moiety. Suitable examples include for example, but are not limited to, beta-(3,4-epoxycyclohexyl)-ethyl trimethoxysilane, beta-(3,4-epoxycyclohexyl)-ethyl methyl dimethoxysilane, beta-(3,4-epoxycyclohexyl)-ethyl methyl diethoxysilane, beta-(3,4-epoxycyclohexyl)-ethyl triethoxysilane.

The functionality of an epoxy resin is the number of reactive epoxy sites per molecule that are available to react and cure to form a cured structure. For example, a bisphenol-A epoxy resin has a functionality of 2, certain glycidyl amines can have a functionality of more than 4.

The reactivity of an epoxy resin is indicated by its epoxide content or epoxy equivalent weight (EEW). This is commonly expressed as the epoxide number, which is the number of epoxide equivalents in 1 kg of resin (Eq/kg), or as the equivalent weight, which is the weight in grams of resin containing 1 mole equivalent of epoxide (g/mol). One measure may be simply converted to another: Equivalent weight (g/mol)=1000/epoxide number (Eq./kg)

The epoxy resins used in the embodiments described herein are polyfunctional. This means that the resin has functionality of at least 2, particularly a functionality of 3 or 4 and higher. Generally it has a high reactivity as indicated by an EEW in the range from 100 to 1500, more particularly an EEW in the range of from 100 to 250.

Suitable difunctional epoxy resins, by way of example, include those based on: diglycidyl ether of bisphenol F, diglycidyl ether of bisphenol A (optionally brominated), phenol and cresol epoxy novolacs, glycidyl ethers of phenol-aldehyde adducts, glycidyl ethers of aliphatic diols, diglycidyl ether, diethylene glycol diglycidyl ether, aromatic epoxy resins, aliphatic polyglycidyl ethers, epoxidized olefins, brominated resins, aromatic glycidyl amines, heterocyclic glycidyl imidines and amides, glycidyl ethers, fluorinated epoxy resins, glycidyl esters or any combination thereof.

Suitable trifunctional epoxy resins, by way of example, may include those based upon phenol and cresol epoxy novolacs, glycidyl ethers of phenol-aldehyde adducts, aromatic epoxy resins, aliphatic triglycidyl ethers, dialiphatic triglycidyl ethers, aliphatic polyglycidyl amines, heterocyclic glycidyl imidines and amides, glycidyl ethers, fluorinated epoxy resins, or any combination thereof. Suitable trifunctional epoxy resins are available from Huntsman Advanced Materials under the tradenames MY0500 and MY0510 (triglycidyl para-aminophenol) and MY0600 and MY0610 (triglycidyl meta-aminophenol). Triglycidyl meta-aminophenol is also available from Sumitomo Chemical Co. (Osaka, Japan) under the tradename ELM-120.

For example, EPI-REZ™ 5003 (Hexion Specialty Chemicals) is an aqueous dispersion of an epoxidized Bisphenol A novolac resin with an average epoxy functionality of 3, weight per epoxide 195-215 (g/equiv.)

Tetrafunctional resins can be used as the multifunctional resin for the formulation of this invention and suitable tetrafunctional epoxy resins include N,N, N',N'-tetraglycidyl-m-xylenediamine (available commercially from Mitsubishi Gas Chemical Company under the name Tetrad-X, and as Erisys GA-240 from CVC Chemicals), and N,N,N', N'-tetraglycidylmethylenedianiline (e.g. MY0720 and MY0721 from Huntsman Advanced Materials). Other suitable multifunctional epoxy resins include DEN438 (from Dow Chemicals, Midland, Mich.) DEN439 (from Dow Chemicals), Araldite ECN 1273 (from Huntsman Advanced Materials), Araldite ECN 1299 and Araldite MY9512 (from Huntsman Advanced Materials), Epirez 5040 (functionality=3.6 195 g/eq); Epirez 5108 (functionality=8 230 g/eq) or Epirez 6066 (functionality=6).

The phrase "epoxy dispersion" refers to a waterborne dispersion containing an epoxy resin, an emulsifier for the epoxy resin and water.

The terms "emulsifier" and "surfactant" as used herein are interchangeable.

Suitable surfactants include nonionic surfactants, cationic surfactants, zwitterionic surfactants, amphoteric surfactants, and ampholytic surfactants.

Suitable nonionic surfactants include alkoxylated fatty alcohols. The nonionic surfactant may be selected from ethoxylated alcohols and ethoxylated alkyl phenols of the formula $R(OC_2H_4)_nOH$, wherein R is selected from the group consisting of aliphatic hydrocarbon radicals containing from about 8 to about 15 carbon atoms and alkyl phenyl radicals in which the alkyl groups contain from about 8 to about 12 carbon atoms, and the average value of n is from about 5 to about 15.

Other non-limiting examples of nonionic surfactants useful herein include: $C_8$-$C_{18}$ alkyl ethoxylates, such as, NEODOL® nonionic surfactants from Shell; $C_6$-$C_{12}$ alkyl phenol alkoxylates where the alkoxylate units may be ethyleneoxy units, propyleneoxy units, or a mixture thereof; $C_{12}$-$C_{18}$ alcohol and $C_6$-$C_{12}$ alkyl phenol condensates with ethylene oxide/propylene oxide block polymers such as Pluronic® from BASF; $C_{14}$-$C_{22}$ mid-chain branched alcohols, BA; $C_{14}$-$C_{22}$ mid-chain branched alkyl alkoxylates, $BAE_x$, wherein x is from 1 to 30; alkylpolysaccharides; specifically alkylpolyglycosides; polyhydroxy fatty acid amides; and ether capped poly(oxyalkylated) alcohol surfactants.

Suitable nonionic detersive surfactants also include alkyl polyglucoside and alkyl alkoxylated alcohol. Suitable nonionic surfactants also include those sold under the tradename Lutensol® from BASF.

Non-limiting examples of cationic surfactants include: the quaternary ammonium surfactants, which can have up to 26 carbon atoms include: alkoxylate quaternary ammonium (AQA) surfactants; dimethyl hydroxyethyl quaternary ammonium; dimethyl hydroxyethyl lauryl ammonium chloride; polyamine cationic surfactants; cationic ester surfactants; and amino surfactants, e.g., amido propyldimethyl amine (APA).

Suitable cationic detersive surfactants also include alkyl pyridinium compounds, alkyl quaternary ammonium compounds, alkyl quaternary phosphonium compounds, alkyl ternary sulphonium compounds, and mixtures thereof.

Suitable cationic detersive surfactants are quaternary ammonium compounds having the general formula:

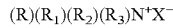

$(R)(R_1)(R_2)(R_3)N^+X^-$ wherein, R is a linear or branched, substituted or unsubstituted $C_{6-18}$ alkyl or alkenyl moiety, $R_1$ and $R_2$ are independently selected from methyl or ethyl moieties, $R_3$ is a hydroxyl, hydroxymethyl or a hydroxyethyl moiety, X is an anion which provides charge neutrality, suitable anions include: halides, for example chloride; sulphate; and sulphonate. Suitable cationic detersive surfactants are mono-$C_{6-18}$ alkyl mono-hydroxyethyl di-methyl quaternary ammonium chlorides. Highly suitable cationic detersive surfactants are mono-$C_{8-10}$ alkyl mono-hydroxyethyl di-methyl quaternary ammonium chloride, mono-$C_{10-12}$ alkyl mono-hydroxyethyl di-methyl quaternary ammonium chloride and mono-$C_{10}$ alkyl mono-hydroxyethyl di-methyl quaternary ammonium chloride.

Examples of zwitterionic surfactants include: derivatives of secondary and tertiary amines, derivatives of heterocyclic secondary and tertiary amines, or derivatives of quaternary ammonium, quaternary phosphonium or tertiary sulfonium compounds. Suitable examples of zwitterionic surfactants include betaines, including alkyl dimethyl betaine and cocodimethyl amidopropyl betaine, $C_8$ to $C_{18}$ (for example from $C_{12}$ to $C_{18}$) amine oxides, and sulfo and hydroxy betaines, such as N-alkyl-N,N-dimethylammino-1-propane sulfonate where the alkyl group can be $C_8$ to $C_{18}$.

Examples of amphoteric surfactants include aliphatic derivatives of secondary or tertiary amines, or aliphatic derivatives of heterocyclic secondary and tertiary amines in which the aliphatic radical may be straight or branched-chain and where one of the aliphatic substituents contains at least about 8 carbon atoms, or from about 8 to about 18 carbon atoms, and at least one of the aliphatic substituents contains an anionic water-solubilizing group, e.g. carboxy, sulfonate, sulfate. Suitable amphoteric surfactants also include sarcosinates, glycinates, taurinates, and mixtures thereof.

Optional curing agents, also referred to as catalyst(s), assist the curing of the formulation of the present embodiments by crosslinking of the epoxy resins and other ingredients in the formulation. The amount of curing agents or curing agent accelerators present in the formulation ranges from about 1% by weight to about 15% by weight and more typically from about 2 to about 12 wt %, from about 3 to about 11 wt %, from 3.5 wt % to 9.5 wt % and from about 4 to about 6 wt % based on the weight of the formulation and/or combinations of the aforesaid wt % ranges.

The curing agent materials can be selected from aliphatic or aromatic amines or their respective adducts, amidoamines, polyamides, cycloaliphatic amines, anhydrides, polycarboxylic polyesters, isocyanates, phenol-based resins (e.g., phenol or cresol novolak resins, copolymers such as those of phenol terpene, polyvinyl phenol, or bisphenol-A formaldehyde copolymers, bishydroxyphenyl alkanes or the like), dihydrazides, sulfonamides, sulfones such as diamino diphenyl sulfone, anhydrides, mercaptans, imidazoles, ureas, tertiary amines, $BF_3$ complexes or mixtures thereof. Curing agents include modified and unmodified polyamines or polyamides such as triethylenetetramine, diethylenetriamine tetraethylenepentamine, cyanoguanidine, dicyandiamides and the like as well as diamino diphenyl sulphone.

Other suitable catalysts include, for example, ammonium hypophosphite, ammonium phosphite or ammonium phosphates.

An accelerator for the curing agents (e.g., a modified or unmodified urea such as methylene diphenyl bis urea, an imidazole, blocked amine or a combination thereof) may also be provided for preparing the formulation. Sulfones such as the amino aromatic sulfones particularly diamino diphenyl sulfone are preferred curatives on woven, nonwoven or granular.

In one embodiment, the composition includes a latex, a polyol, a water soluble carboxylic acid polymer (e.g., SMA)

and an epoxy. The latex is present in the composition from about 35 wt % to about 95 wt % based upon the total wt % of the composition. In particular, the latex is present from about 55 wt % to about 90 wt %, more particularly from about 80 wt % to about 90 wt %, even more particularly from about 82 wt % to about 90 wt % and all percentages and ranges encompassing from about 40 wt % to about 90 wt % inclusive (e.g. 40 wt %, 50 wt %, 60 wt %, 70 wt %, 80 wt %, 90 wt %, 95 wt % and all percentages and ranges there between).

In one aspect, the latex is present in the composition from about 80 wt % to about 95 wt %.

In one aspect, the latex is a styrene butadiene copolymer (SB) or a styrene acrylate copolymer (SA), or a vinyl acetate or an ethylene vinyl acetate or an acrylate acetate copolymer.

The polyol is present in the composition from about 0 wt % to about 60 wt % based upon the total wt % of the composition. In particular, the polyol is present from about 5 wt % to about 45 wt %, more particularly from about 7 wt % to about 30 wt %, even more particularly from about 9 wt % to about 25 wt %, e.g., 10 wt % and all percentages and ranges encompassing from about 0 wt % to about 60 wt % inclusive (e.g., 5 wt %, 10 wt %, 15 wt %, 20 wt %, 40 wt %, 55 wt %, etc. through 60 wt % and all percentages and ranges there between).

In one aspect, the polyol is present in the composition from about 5 wt % to about 15 wt %.

The water soluble carboxylic acid polymer is present in the composition from about 1 wt % to about 20 wt % based upon the total wt % of the composition. In particular, the water soluble carboxylic acid polymer is present from about 1 wt % to about 10 wt %, more particularly from about 2 wt % to about 8 wt %, even more particularly from about 3 wt % to about 7 wt % and all percentages and ranges encompassing from about 1 wt % to about 20 wt % inclusive (e.g., 1 wt %, 2 wt %, 3 wt %, 4 wt %, 5 wt %, 6 wt %, 7 wt %, 8 wt %, 9 wt %, etc. through 20 wt % and all percentages and ranges there between.

In one aspect, the water soluble carboxylic acid polymer is present in the composition from about 4 wt % to about 10 wt %.

The epoxy is present in the composition from about 0.2 wt % to about 10 wt % based upon the total wt % of the composition. In one aspect, the epoxy can include an epoxy silane and an epoxy resin as noted above. In particular, the epoxy is present from about 1 wt % to about 12 wt %, more particularly from about 3 wt % to about 10 wt %, even more particularly from about 4 wt % to about 8 wt % and all percentages and ranges encompassing from about 1 wt % to about 15 wt % inclusive (e.g., 1 wt %, 2 wt %, 3 wt %, 4 wt %, 5 wt %, 6 wt %, 7 wt %, 8 wt %, 9 wt %, etc. through 15 wt % and all percentages and ranges there between).

In one aspect, the epoxy is present in the composition from about 1 wt % to about 10 wt %.

In another aspect, the epoxysilane is present in the composition from about 1 wt % to about 6 wt %, e.g., 1 wt % to about 2 wt %.

In one aspect, the compositions comprise less than 70 wt % of a water soluble carboxylic acid polymer and a polyol of the total wt % of the composition, more particularly from about 40 to about 50 wt %, even more particularly from about 8 to about 20 wt %, and even more particularly from about 10 to about 30 wt % inclusive (e.g., wherein the combined weight of the water soluble carboxylic acid polymer and polyol is 8 wt %, 9 wt %, 10 wt %, 11 wt %, 12 wt %, 13 wt %, 14 wt %, 15 wt %, 16 wt %, 17 wt %, 18 wt %, etc. through 50 wt % and all percentages and ranges there between).

In another embodiment, the composition includes a latex, a polyol, an epoxy silane and an epoxy resin as described above. The latex is present in the composition from about 35 wt % to about 95 wt % based upon the total wt % of the composition. In particular, the latex is present from about 55 wt % to about 90 wt %, more particularly from about 80 wt % to about 90 wt %, even more particularly from about 82 wt % to about 90 wt % and all percentages and ranges encompassing from about 40 wt % to about 90 wt % inclusive (e.g. 40 wt %, 50 wt %, 60 wt %, 70 wt %, 80 wt %, 90 wt %, 95 wt % and all percentages and ranges there between).

In one aspect, the latex is present in the composition from about 80 wt % to about 95 wt %.

In one aspect, the latex is a styrene butadiene copolymer (SB) or a styrene acrylic acid (SA).

The polyol is present in the composition from about 0 wt % to about 60 wt % based upon the total wt % of the composition. In particular, the polyol is present from about 5 wt % to about 45 wt %, more particularly from about 7 wt % to about 30 wt %, even more particularly from about 9 wt % to about 25 wt %, e.g., 10 wt % and all percentages and ranges encompassing from about 0 wt % to about 60 wt % inclusive (e.g., 5 wt %, 10 wt %, 15 wt %, 20 wt %, 40 wt %, 55 wt %, etc. through 60 wt % and all percentages and ranges there between).

In one aspect, the polyol is present in the composition from about 5 wt % to about 15 wt %.

The epoxy silane and epoxy resin combination (in total) is present in the composition from about 1 wt % to about 15 wt % based upon the total wt % of the composition. In particular, the epoxy components are present from about 2 wt % to about 12 wt %, more particularly from about 3 wt % to about 10 wt %, even more particularly from about 4 wt % to about 8 wt % and all percentages and ranges encompassing from about 1 wt % to about 15 wt % inclusive (e.g., 1 wt %, 2 wt %, 3 wt %, 4 wt %, 5 wt %, 6 wt %, 7 wt %, 8 wt %, 9 wt %, etc. through 15 wt % and all percentages and ranges there between).

In one aspect, the epoxy silane and epoxy resin are present in the composition from about 1 wt % to about 10 wt % in total.

In one aspect, the ratio of epoxy silane to an epoxy resin is about 1:1 to about 1:10, including 1:2, 1:3, 1:4, etc. through and including 1:10 and all ranges and values there between. Alternatively, the ratio of epoxy silane to an epoxy resin is about 10:1 to about 1:1, including 9:1, 8:1, 7:1, 6:1 through and including 1:1 and all ranges and values there between.

If an optional additive is present in the compositions described herein, the additive can be present from about 0.01 wt % to about 10 wt % based upon the total wt % of the composition. In particular the additive(s) can be present from about 0.5 wt % to about 7 wt %, more particularly from about 0.75 wt % to about 5 wt % and more particularly from about 1 wt % to about 7 wt % and all percentages and ranges encompassing from about 0.01 wt % to about 10 wt % inclusive (e.g., 0.02 wt %, 0.03 wt %, 0.04 wt %, etc. through 9.99 wt % including 10 wt %).

It should be understood that the wt % noted above for the latex polymers and other components, including the water soluble carboxylic acid polymer, are based on dry weights of the solids. The solids percentage of the binder formulation varies from about 5 wt % to about 40 wt % solids and is adjusted according to pick up. The remaining weight being water, optionally, with one or more water miscible solvents, such as alcohols (e.g., glycols, cellosolve, etc.).

The compositions described herein are useful as binders for nonwovens, wovens, fibrous webs, glasses, glass fibers, mineral wool and particulate (granular) supports, wood chips/particles, mica, talc, silica and the like. The binder composition is applied according to the state of the art techniques, such as by impregnation, curtain coating, etc.

In general, the components of the binder composition are mixed together at ambient conditions, applied to a substrate (woven, nonwoven, granular particulates) and dried at an elevated temperature to effect binding of the material.

The conditions described herein are for test conditions in a laboratory. The substrate is treated with the binder composition, by immersion in a bath of formulation for a few minutes, e.g., 2 minutes. The excess binder composition is removed by passing the wetted substrate through a foulard nip (pressure about 2.5 bars). The treated substrate is then dried, for example, for about 5 to about 10 minutes at 170 to 200° C., e.g., about 180° C. The drying process evaporates the water/solvent to leave a solid binding composition. Generally, the solids content of the binder formulation (prior to evaporation/drying) is from about 10 to about 20 wt % based on the total weight of the composition with solvent(s)/water, and all percentages and ranges encompassing from about 10 wt % to about 20 wt % (e.g., about 11 wt %, 12 wt %, 13 wt %, etc. through 20 wt % inclusive of all percentages and ranges there between).

Generally, the final dry binder pick up is approximately 1 wt % to about 35 wt % final dry weight, more particularly from about 15 wt % to about 25 wt %, even more particularly from about 18 wt % to about 21 wt %, and even more particularly from about 20 to about 22 wt % and all percentages and ranges encompassing from about 15 wt % to about 25 wt % (e.g., about 15 wt %, 16 wt %, 17 wt %, 18 wt %, 19 wt %, 20 wt %, 21 wt %, 22 wt % through 25 wt % and all percentages and ranges there between).

The following paragraphs enumerated consecutively from 1 through 38 provide for various aspects of the present invention. In one embodiment, in a first paragraph (1), the present invention provides formaldehyde free composition comprising:
a latex emulsion;
an epoxysilane;
an epoxy dispersion;
a polyol; and, optionally,
an additive, wherein the composition does not comprise formaldehyde.

2. The formaldehyde free composition of claim 1, wherein the latex emulsion is a copolymerization product of one or more of vinylaromatic monomer(s), acrylic acid, methacrylic acid, acrylate monomer(s), methacrylate monomer(s), acrylonitrile, vinyl acetate, ethylene, propylene, acrylamide, methacrylamide, hydroxyalkyl acrylate(s), itaconate(s), fumarate(s), or hydroxyalkyl methacrylate(s).

3. The formaldehyde free composition of either of claim 1 or 2, wherein the epoxysilane comprises:

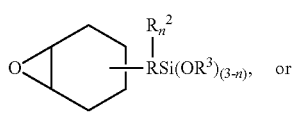

or

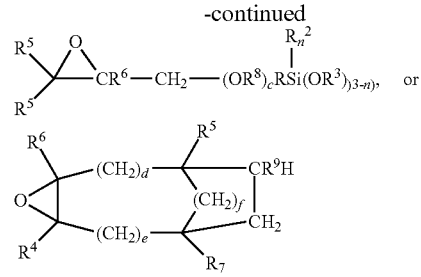

where:
R is $(CH_2)_m$, where m has a value of 0 to 6;
$R^2$ is a $C_1$-$C_{10}$ alkyl, optionally substituted with a $C_1$-$C_{10}$ alkoxy, or a $C_6$-$C_{10}$ aryl or a $C_7$-$C_{10}$ aralkyl group;
$R^3$ is a $C_2$-$C_6$ alkyl, optionally substituted with a $C_1$-$C_{10}$ alkoxy, or a $C_6$-$C_{10}$ aryl or a $C_7$-$C_{10}$ aralkyl group;
$R^4$, $R^5$, $R^6$ or $R^7$ are individually each hydrogen or a $C^1$-$C^6$ alkyl group;
$R^8$ is a $C_1$-$C_4$ alkylene group or a $C_7$-$C_{10}$ aralkylene or a $C_6$-$C_{10}$ arylene group;
$R^9$ is $RSi(R_n^2)(OR^3)_{3-n}$;
n is 0, 1 or 2;
c, d and e are each independently 0 or 1; and
f is 0, 1 or 2.

4. The formaldehyde free composition of claim 3, wherein the epoxysilane comprises a glycidoxy silane.

5. The formaldehyde free composition of claim 4, wherein glycidoxy silane comprises one or more of gamma-glycidoxypropyl trimethoxysilane, gamma-glycidoxypropyl triethoxysilane, gamma-glycidoxypropyl methyldimethoxysilane, or gamma-glycidoxypropyl methyldiethoxysilane.

6. The formaldehyde free composition of claim 3, wherein the epoxysilane comprises beta-(3,4-epoxycyclohexyl)-ethyl trimethoxysilane, beta-(3,4-epoxycyclohexyl)-ethyl methyl dimethoxysilane, beta-(3,4-epoxycyclohexyl)-ethyl methyl diethoxysilane, beta-(3,4-epoxycyclohexyl)-ethyl triethoxysilane.

7. The formaldehyde free composition of any of claims 1 through 6, wherein the epoxy dispersion comprises an epoxidized Bisphenol A novolac resin.

8. The formaldehyde free composition of any of claims 1 through 7, further comprising a polyol.

9. The formaldehyde free composition of claim 8, wherein the polyol is starch.

10. The formaldehyde free composition of any of claims 1 through 9, further comprising an additive.

11. The formaldehyde free composition of any of claims 1 through 10, wherein the wt % of the latex is from about 55 wt % to about 95 wt %.

12. The formaldehyde free composition of any of claims 1 through 11, wherein the wt % of the polyol is from about 2 wt % to about 50 wt %.

13. The formaldehyde free composition of any of claims 1 through 12, wherein the wt % of the epoxy silane and the epoxy resin is from about 1 wt % to about 10 wt % in total.

14. The formaldehyde free composition of any of claims 1 through 13, wherein the wt % of the optional additive is from about 1 wt % to about 5 wt %.

15. A non-woven, a woven or a granular particulate in combination with any of claims 1 through 14.

16. A formaldehyde free composition comprising:
a latex emulsion;
an epoxysilane or an epoxy dispersion or a mixture of both;

a water soluble polycarboxylic acid;
a polyol; and, optionally,
an additive, wherein the composition does not comprise formaldehyde.

17. The formaldehyde free composition of claim 16, wherein the latex emulsion is a copolymerization product of one or more of vinylaromatic monomer(s), acrylic acid, methacrylic acid, acrylate monomer(s), methacrylate monomer(s), acrylonitrile, vinyl acetate, ethylene, propylene, acrylamide, methacrylamide, hydroxyalkyl acrylate(s), and hydroxyalkyl methacrylate(s).

18. The formaldehyde free composition of either of claim 16 or 17, wherein the epoxysilane comprises:

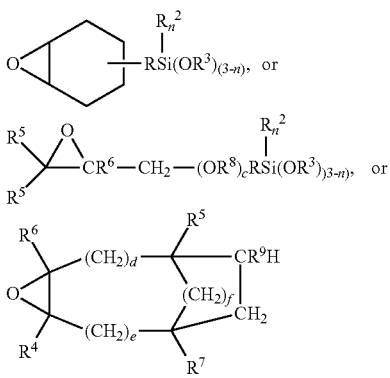

where:
R is $(CH_2)_m$, where m has a value of 0 to 6;
$R^2$ is a $C_1$-$C_{10}$ alkyl, optionally substituted with a $C_1$-$C_{10}$ alkoxy, or a $C_6$-$C_{10}$ aryl or a $C_7$-$C_{10}$ aralkyl group;
$R^3$ is a $C_2$-$C_6$ alkyl, optionally substituted with a $C_1$-$C_{10}$ alkoxy, or a $C_6$-$C_{10}$ aryl or a $C_7$-$C_{10}$ aralkyl group;
$R^4$, $R^5$, $R^6$ or $R^7$ are individually each hydrogen or a $C^1$-$C^6$ alkyl group;
$R^8$ is a $C_1$-$C_4$ alkylene group or a $C_7$-$C_{10}$ aralkylene or a $C_6$-$C_{10}$ arylene group;
$R^9$ is $RSi(R_n^2)(OR^3)_{3-n}$;
n is 0, 1 or 2;
c, d and e are each independently 0 or 1; and
f is 0, 1 or 2.

19. The formaldehyde free composition of claim 18, wherein the epoxysilane comprises a glycidoxy silane.

20. The formaldehyde free composition of claim 19, wherein glycidoxy silane comprises one or more of gamma-glycidoxypropyl trimethoxysilane, gamma-glycidoxypropyl triethoxysilane, gamma-glycidoxypropyl methyldimethoxysilane, or gamma-glycidoxypropyl methyldiethoxysilane.

21. The formaldehyde free composition of claim 18, wherein the epoxysilane comprises beta-(3,4-epoxycyclohexyl)-ethyl trimethoxysilane, beta-(3,4-epoxycyclohexyl)-ethyl methyl dimethoxysilane, beta-(3,4-epoxycyclohexyl)-ethyl methyl diethoxysilane, beta-(3,4-epoxycyclohexyl)-ethyl triethoxysilane.

22. The formaldehyde free composition of any of claims 16 through 21, wherein the epoxy dispersion comprises an epoxidized Bisphenol A novolac resin.

23. The formaldehyde free composition of any of claims 16 through 22, further comprising a polyol.

24. The formaldehyde free composition of claim 23, wherein the polyol is starch.

25. The formaldehyde free composition of any of claims 16 through 24, wherein the water soluble polycarboxylic acid is a polymer.

26. The formaldehyde free composition of claim 25, wherein the water soluble polycarboxylic acid is a styrene/maleic acid copolymer, a styrene/maleic acid anhydride copolymer, a styrene/acrylic acid copolymer, a styrene/methacrylic acid copolymer, an acrylate/methacrylic acid copolymer, an acrylic acid/methacrylic acid copolymer, an acrylic acid/methacrylate copolymer; a polyacrylic acid, or a polymethacrylic acid and mixtures thereof.

27. The formaldehyde free composition of claim 26, wherein the water soluble polycarboxylic acid is a styrene/maleic acid copolymer.

28. The formaldehyde free composition of claim 27, wherein the styrene/maleic acid has a weight average molecular weight of from about 5000 to about 100000.

29. The formaldehyde free composition of either of any of claims 26 through 28, wherein the water soluble polycarboxylic acid is present as a salt form.

30. The formaldehyde free composition of claim 29, wherein the polycarboxylic acid salt is an amine salt, an ammonium salt or an alkaline earth metal salt.

31. The formaldehyde free composition of any of claims 16 through 30, further comprising an additive.

32. The formaldehyde free composition of any of claims 16 through 31, wherein the wt % of the latex is from about 55 wt % to about 95 wt %.

33. The formaldehyde free composition of any of claims 16 through 32, wherein the wt % of the polyol is from about 2 wt % to about 15 wt %.

34. The formaldehyde free composition of any of claims 16 through 33, wherein the wt % of the epoxy silane or the epoxy resin or both together is from about 1 wt % to about 10 wt %.

35. The formaldehyde free composition of any of claims 16 through 34, wherein the wt % of the optional additive is from about 1 wt % to about 5 wt %.

36. The formaldehyde free composition of any of claims 16 through 35, wherein the wt % of the water soluble polycarboxylic acid polymer is from about 4 wt % to about 10 wt %.

37. A synthetic fiber, a mineral fiber, a cellulosic fiber or any combination thereof, a non-woven, a woven, a sheet, or a granular particulate in combination with any of claims 16 through 36.

38. A method for producing a formaldehyde free article comprising the steps:
applying an aqueous binder formulation which is formaldehyde free according to any of claims 1 through 36, to a woven, a non-woven, a fibrous web or sheet, a glass, a glass fiber, mineral wool, a cellulosic fiber or any combination thereof, or blending the aqueous binder with a granular material to form an article;
optionally shaping the article; and
exposing the article to an elevated temperature of greater than or equal to 100° C. to cure the formulation in and to the article.

The invention will be further described with reference to the following non-limiting Examples. It will be apparent to those skilled in the art that many changes can be made in the embodiments described without departing from the scope of the present invention. Thus the scope of the present invention should not be limited to the embodiments described in this application, but only by embodiments described by the language of the claims and the equivalents of those embodiments. Unless otherwise indicated, all percentages are by weight.

EXAMPLES

Sample Preparation and Test Conditions

Solids content of all the formulations in Table 1 are 12 to 14%-adjusted to obtain a final dry binder pick up of 20 to 21% on final dry weight.

The formulation was prepared a room temperature. Starch was first dissolved in water and heated until dissolution. The epoxysilane is mixed with the latex. The latex formulated with the epoxysilane, starch and the water soluble polycarboxylic acid polymer (SMA) were then mixed at room temperature. Suitable epoxide or epoxy resin was then added to the mixture at room temperature and stirred. The resultant mixture was stable at room temperature for at least 3 hours after preparation and could be considered shelf stable.

In some examples the epoxysilane is mixed with the latex. The latex formulated with the epoxysilane, starch and the water soluble polycarboxylic acid polymer (SMA) were then mixed at room temperature.

In other examples, the soluble polycarboxylic acid polymer (SMA) and the epoxysilane were mixed into the latex in a "stable ready to use" formulated latex. The binder formulation was prepared by addition of the starch and water to this "ready to use" latex.

Suitable epoxide or epoxy resin was then added to the mixture at room temperature and stirred. The resultant mixture was stable at room temperature for at least 3 hours after preparation and could be considered shelf stable.

Nonwoven Base A: Polyester spunbond nonwoven base of grammage of 160 gsm without reinforcing threads, sheets of 45 cm (in MD)×27 cm (in CD).

The polyester spunbond nonwoven bases A and B were soaked in the formulation for 2 minutes at ambient conditions.

Excess of binder formulation was removed by passing the wetted nonwoven thorough a Lab Mathis foulard nip (pressure=2.5 bars) to provide a treated nonwoven The treated nonwoven was then dried in a Mathis Oven for 8 minutes at 180° C.

Sample Testing

Thermal dimensional stability (TDS) is a measurement of the deformation (elongation and shrinkage) of a sample of 10 cm×25 cm in a creep test. TDS is important, for example, for the non-woven used for bituminized water proofing membranes. Lower TDS values are optimal.

The TDS creep test conditions were adjusted to the different nonwoven bases, in order to get representative data, able to properly discriminate the effect of the binder formulation.

For nonwoven base A: a load of 8 kg/10 cm was applied in the machine direction during 15 minutes at 200° C.; i.e. the samples are 10 cm (in CD "cross direction")×25 cm (in MD "machine direction).

For nonwoven base B: In the first series of measurements a load of 8 kg/10 cm is applied in machine direction during 15 minutes at 200° C.; i.e. the samples are 10 cm (in CD "cross direction")×25 cm (in MD "machine direction). In a second serices of measurements, a load of 4 kg/10 cm is applied in cross direction direction during 15 minutes at 200° C.; i.e. the samples are 10 cm (MD "machine direction)×25 cm (in CD "cross direction). This second series of measurements allows for determination of the contribution of the binder formulation, independently of the reinforcing effect of the glass fiber threads.

For nonwoven base C: a load of 4 kg/10 cm is applied in cross direction during 10 minutes at 200° C.; i.e. the samples are 10 cm (MD "machine direction)×25 cm (in CD "cross direction). This condition allows determination of the contribution of the binder formulation, independently of the reinforcing effect of the glass fiber threads.

Load and elongation at break, are measured according to DIN EN 29073 (ISO09073-3).

TABLE 1

Spunbond Base A

| | Latex XZ 97223 | Starch | Melamine formaldehyde resin (Saduren163) | Styrene maleic acid copolymer (Xiran 40005) | Epoxysilane (CoatOsil 2287) | Epoxy resin dispersion (Epirez) | Load at break (N/5 cm) | Elongation at break (%) | Thermal dimensional stability creep test, (load: 8 kg/10 cm, 200° C., 15 min) (the lower the better) % elongation (in load direction) | % shrinkage (perpendicular to load direction) |
|---|---|---|---|---|---|---|---|---|---|---|
| R1 | 90 | 10 | | | | | 663 | 466 | 36 36.4 9.1 | 17.3 |
| R2 | 83 | 10 | 7 | | | | 647 | 489 | 30.2 34.4 7.7 | 11.7 |
| R6 | 84.6 | 10 | | | 5.4 | | 626 | 451 | 33.4 34.3 9.1 | 14.5 |
| R8 | 82 | 10 | | 8 | | | 624 | 474 | 30 33 8.7 | 14.1 |
| R13 | 83 | 10 | | | | 7p Epirez 5003 | 657 | 479 | 35.5 36.8 8.7 | 17.9 |
| Y1 | 92 | 0 | | | 6 | 2 | 649 | 503 | 34.4 35.2 9.4 | 16.3 |
| D6 | 86 | 10 | | | 2 | 2 | | | 7.6 | 10.1 |
| Y2 | 96 | 0 | | | 1 | 3p Epirez 5003 | 661 | 36.7 | 8.6 | 13.2 |
| D10 | 86 | 10 | | | 1 | 3p Epirez 5003 | | | 7.4 | 10.7 |
| DXX | 82 | 10 | | | 6 | 2p Epirez 5003 | 648 | 32.8 | 8.5 | 13.6 |

TABLE 1-continued

Spunbond Base A

| | | | Styrene | | | | | Thermal dimensional stability creep test, (load: 8 kg/10 cm, 200° C., 15 min) (the lower the better) | |
|---|---|---|---|---|---|---|---|---|---|
| Latex XZ 96904 | Starch | Melamine formaldehyde resin (Saduren163) | maleic acid copolymer (Xiran 40005) | Epoxysilane (CoatOsil 2287) | Epoxy resin dispersion None | Load at break (N/5 cm) | Elongation at break (%) | % elongation (in load direction) | % shrinkage (perpendicular to load direction) |
| Rx2 83 | 10 | 7 | | | | 573 | 27.2 | 8.7 | 13.9 |
| DX6 84.6 | 10 | | | 4.6 | 2 | 601 | 29 | 9.1 | 14.6 |

Solids content of Xiran 40005 was 30 wt %. Styrene content of 52% and weight average molecular weight of 5000 (available from Polyscope).

Solids content of Latex XZ 97223 (Trinseo) was 50 wt % and is a carboxylated styrene/butadiene/acrylate/acrylonitrile latex functionalized with hydroxyl alkyl acrylate, having a glass transition temperature of 34° C. and a particle size of about 110 nm.

XZ 96904 (Trinseo) is a carboxylated styrene/butyl acrylate latex functionalized with a hydroxyl alkyl acrylate with a Tg of 29° C. and a particle size of about 170 nm.

The solids content of Epirez 5003 was 58 wt %.

All components in Table 1 are reported in "parts" on a dry weight basis.

Saduren 163 (available from BASF) is a hard melamine formaldehyde crosslinking resin (74% in water as a solution).

Formulations R2 and RX2 are state of the art formulations for non-woven for bituminized water proofing membranes (with either XZ 97223 or XZ 96904). They contain 7p (parts) of a melamine formaldehyde resin as crosslinker Saduren 163), and accordingly releases significant amount of formaldehyde, exposing workers to it. Formulations R2 (and RX2) provide TDS target values for the corresponding latex. Any alternative crosslinker system or formulation, in order to be useful, should provide a TDS which is the same or better (i.e. lower deformation values).

Formulation R1 is similar to the R2 formulation but without any crosslinker. The effectiveness of a crosslinker or crosslinker combination was assessed by the improvement in TDS relative to formulation R1.

Epoxysilane Alone as Replacement of Melamine Formaldehyde Crosslinker

Formulation R6 uses epoxysilane (CoatOSil 2287) at 5.4 p as a substitute of melamine formaldehyde resin. TDS was only marginally better than for the crosslinker free formulation R1, and did not meet the target TDS values given by the melamine formaldehyde containing formulation R2.

This indicated that the epoxysilane when used as single crosslinking component as replacement of melamine formaldehyde resin did not provide the required end use characteristics for the impregnated non-woven, and had a poor crosslinking efficiency of the binder.

Styrene Maleic Acid Copolymer as Replacement of Melamine Formaldehyde Crosslinker Formulation R8 provided styrene maleic acid copolymer (Xiran 40005) at 8 p as a substitute for melamine formaldehyde resin. TDS was only marginally better than for the crosslinker free formulation R1, and did not provide the target TDS values given by the melamine formaldehyde containing formulation R2.

The results indicated that styrene maleic acid copolymer when used as single crosslinking component as replacement of melamine formaldehyde resin did not provide the desired end use characteristics for the impregnated non-woven, and had a poor crosslinking efficiency of the binder.

Waterborne Epoxy Dispersion as Replacement of Melamine Formaldehyde Crosslinker

Formulation R13 provided a waterborne epoxy dispersion (Epirez 5003) at 7 p as a substitute for melamine formaldehyde crosslinker. TDS was not improved as compared to the crosslinker free formulation R1, and did not provide the target TDS values of the melamine formaldehyde containing formulation R2.

The results indicated that the waterborne epoxy dispersion, when use as a single crosslinking component as replacement for melamine formaldehyde resin, did not provide sufficient crosslinking of the binders and did not provide the desired end use characteristics for the impregnated non-woven.

Synergy Between Epoxysilane and Waterborne Epoxy Dispersion

Formulation D10 combined 1 p of an epoxysilane and 3 p of a waterborne epoxy dispersion. As shown by formulations R6 and R13, each of the components when used alone as a replacement of the melamine formaldehyde, did not provide a binder that resulted in the target TDS values (formulation R2), and did not result in a significant improvement of TDS compared to the crosslinker free formulation R1.

Surprisingly, epoxysilane and the waterborne epoxy dispersion utilized in combination provided suitable TDS values, demonstrating a pronounced improvement compared to the crosslinker free formulation, R1. It was even more an unexpected achievement, considering the low concentrations of the epoxysilane and the waterborne epoxy dispersion, respectively of 1p and 3 p, lower than the 7 p of melamine formaldehyde resin of reference formulation R2.

These results demonstrate that the combination of epoxysilane and waterborne epoxy dispersion, even at amounts as low as 1 p and 3 p, respectively, had a noticeable crosslinking effect of the binder formulation, comparable to the melamine formaldehyde crosslinker.

In contrast, an epoxy silane or a waterborne epoxy dispersion when used alone, did not perform as well as the combination of the two. This result surprisingly demonstrated a strong synergistic effect between the epoxysilane and the waterborne epoxy dispersion (the combination performed much better than the simple additive effect of each of them).

This synergistic effect further allows for lower amounts for the epoxysilane as well as for the epoxy dispersion, which helps to mitigate total formulation cost increases.

These formulations are also formaldehyde free and do not release formaldehyde upon curing.

CoatOsil 2287 is classified according to Regulation EC No 1272/2008 as Skin Sens. Category 1 H317. Waterborne epoxy dispersion CPL regulation (Regulation EC No 1272/2008) depends on the epoxy resin molecular weight. Epirez 5003 used in example of the invention has following classification according regulation EC 1272/2008. Skin Corr./Irrit. Category 2 H315, Eye Dam./Irrit. Category 2 H319, Skin Sens. Category 1 H317, Aquatic Chronic Category 2 H 411

As a result, this combination can be used safely, without exposing workers to EH&S issues, providing that standard personal protective equipment (gloves and safety glasses) are worn by workers. In particular, there is no carcinogenic or teratogenic risk like that for melamine formaldehyde crosslinkers.

Synergy Between Epoxysilane and Styrene Maleic Acid Copolymer

Formulation D6 according to the invention, combines 2 p epoxysilane and 2 p of styrene maleic acid copolymer (Xiran 40005). As shown by formulations R6 and R8, each of these components when used alone as a replacement of melamine formaldehyde, did not provide target TDS values (formulation R2), and did not result in any significant improvement of TDS compared to the crosslinker free formulation R1.

Surprisingly, epoxysilane and styrene maleic acid used in combination provided the target TDS values, demonstrating a pronounced improvement compared to the crosslinker free formulation. It was even more an unexpected achievement, considering the low concentration of the epoxysilane and the styrene maleic acid, respectively of 2 p and 2 p, lower than the 7 p of melamine formaldehyde resin of reference formulation R2. Note that formulation DXX in Table 1 did not fully work where an epoxy was substituted for an epoxysilane.

According to formulation DXX, TDS was improved compared to formulation R1 (free of crosslinker), which demonstrates some degree of efficiency. However TDS is not at target (as given by R2) or not as good as formulation D6. It surprisingly shows that the combination of SMA+epoxy silane has a "strong" synergistic effect, whereas for SMA+ epoxy dispersion this effect is much lower.

The results demonstrate that the combination of epoxysilane and styrene maleic acid, even at amounts as low as 2 p and 2 p, respectively, had a noticeable crosslinking effect of the binder formulation, at least equivalent to the melamine formaldehyde crosslinker, R2.

In contrast, both the epoxysilane or the styrene maleic acid when used alone performed poorly, however, the combination of both of them performed extremely well. This result demonstrated a strong synergistic effect between the epoxysilane and the styrene maleic acid (the combination performed much better than the simple additive effect of each of them).

This synergistic effect further allows for decreased amounts for the epoxysilane as well as for the styrene maleic acid, which helps to mitigate total formulation cost increase.

These formulations are also formaldehyde free and do not release formaldehyde upon curing.

CoatOsil 2287 is classified according to Regulation EC No 1272/2008 as Skin Sens. Category 1 H317. Waterborne epoxy dispersion CPL regulation (Regulation EC No 1272/2008) depends on the epoxy resin molecular weight.

Styrene maleic acid copolymers have no health issues and are not classified according Regulation EC No 1272/2008.

Examples with formulation of the epoxysilane or the epoxysilane and the styrene maleic acid copolymer into the latex & examples with variation of the amount of starch in the formulation Test Conditions:

Non-woven base B: PET spunbond, glass fiber thread reinforced in Machine direction: 160 gsm, reinforced in MD with continuous glassfiber threads (13 threads per 10 cm), sheets of 45 cm (in MD)×27 cm (in CD).

Impregnation Conditions:

Soaking time of substrate in formulation: 2 minutes

Formulation SC=13.5% (SC=solids content)

Foulard pressure: 2.5 bar—single pass

Drying time: 8 min @ 180° C., fan speed 2000 rpm, Mathis Oven

Pick up: ca 20.5%-21.5%

Thermal Dimensional Stability Testing load in MD: 8 kg/10 cm, 200° C., 10 min. (this is same as for previous examples)

load in CD: 4 kg/10 cm, 200° C., 10 min.

Application of the load in CD allows the determination of the contribution of the binder formulation only, independently of the effect of the reinforcing glass fibers.

Results

Examples 1 to 3: demonstrated that the Epoxysilane can be formulated into the latex 3 weeks before impregnation. SRS 1759=XZ 97223 formulated with 1.75% of CoatOsil 2287 prepared 3 weeks before impregnation.

Example 4 demonstrated that both the Epoxysilane and the Xiran can be formulated into the latex 6 weeks before impregnation. SRS 1663=XZ 97223+4.5% Xiran 40005+ 1.8% CoatOsil 2287 prepared 6 weeks before impregnation.

Examples 1 to 3 were compared to Reference sample 1 to reference 3, which compares the formaldehyde free crosslinking of the present embodiments (combination of an epoxysilane and Xiran) to the state of the art crosslinked melamine formaldehyde resin (Saduren 163) with different amounts of starch in the formulation. The TDS with load in CD (thermal dimensional stability with load in cross direction) with the inventive embodiments is better than the reference examples (lower elongation and shrinkage values). See Table 2.

TABLE 2

Spunbond Base B

| | Impregnation formulation | | | | | | | Load at Break | | Elongation at break | | TDS, load in CD 4 kg, 200° C., 15 min | | TDS, load in Machine 8 kg, 200° C., 15 min | |
|---|---|---|---|---|---|---|---|---|---|---|---|---|---|---|---|
| | Latex composition | | | | | | | (N/5 cm) | | (%) | | % | % | % | % |
| latex ref | latex | CoatOsil | Xiran | latex | Saduren | Xiran | Starch | MD | CD | MD | CD | elongation | shrinkage | elongation | shrinkage |
| Ref 1 | XZ 97223 | | | 86.5 | 3.5 | | 10 | 725 | 403 | 26.2 | 33.9 | 8.6% | 7.1% | 1.0% | 1.0% |
| Ref 2 | XZ 97223 | | | 88.5 | 3.5 | | 8 | 731 | 433 | 28.9 | 35.6 | 8.7% | 8.0% | 1.2% | 1.2% |
| Ref 3 | XZ 97223 | | | 90.5 | 3.5 | | 6 | 766 | 429 | 30.0 | 35.4 | 8.7% | 8.3% | 0.3% | 0.7% |
| Ex 1 | SRS 1759 | XZ 97223 | 1.75 | | 86 | 4 | 10 | 593 | 414 | 26.4 | 32.5 | 7.4% | 7.7% | 1.0% | 1.7% |
| Ex 2 | SRS 1759 | XZ 97223 | 1.75 | | 88 | 4 | 8 | 570 | 463 | 29.8 | 32.7 | 6.8% | 7.4% | 0.7% | 1.3% |
| Ex 3 | SRS 1759 | XZ 97223 | 1.75 | | 90 | 4 | 6 | 577 | 468 | 27.4 | 32.2 | 6.5% | 7.5% | 0.8% | 1.0% |
| Ex 4 | SRS 1663 | XZ 97223 | 1.8 | 4.5 | 90 | | 10 | 594 | 455 | 26.9 | 33.0 | 7.3% | 7.1% | 0.5% | 1.0% |

Examples of the Crosslinking System in Formulation with SA (Styrene Acrylate) Latex Test conditions are the same as above.

Results

These two formulations were to test a formaldehyde free crosslinking system for a styrene acrylate latex.

Reference 4 is the formulation free of any crosslinker. The latex used was SRS 1742, which is a styrene, butyl acrylate, acrylonitrile latex. Solids content of Latex SRS 1742 is 50 wt % and is a carboxylated styrene/butylacrylate/acrylonitrile latex functionalized with hydroxyl alkyl acrylate, having a glass transition temperature of 32° C. and a particle size of about 190 nm.

Example 5 was a formulation that was a combination of Xiran and CoatOsil used as crosslinker. The CoatOsil was formulated directly into the latex SRS 1745 (=SRS 1742+ 1.75% CoatOsil 2287), the Xiran was added as the binder formulation. SRS 1745 was prepared 3 weeks before preparation of the binder formulation and the impregnation.

Table 3 demonstrates that the formaldehyde free crosslinking system of the embodiment effectively crosslinks and improves the TDS performances versus a formulation without a crosslinker.

Example of a Stapled Fiber Non-Woven Base

Test Conditions

Base: Non-woven base C: Polyester staple fibers nonwoven of grammage of 95 gsm, reinforced in MD with continuous glass fiber threads (13 threads per 10 cm), sheets of 45 cm (in MD)×27 cm (in CD).

For this base the reference formulation has a much higher amount of melamine formaldehyde (Saduren 163) as a crosslinker; 26 p instead of 10 p in the case of the previously used spunbond base A and B.

Impregnation Conditions:

Soaking time: The polyester staple fibers nonwoven base C was soaked in the formulation for 30 seconds at ambient conditions.

Formulation: SC=13.5%

Foulard pressure: 2.5 bar—single pass

Drying: 8 min at 80° C., fan speed 2000 rpm

Pick up: ca 18% (on final weight) or 21.5% on base weight

Thermal Dimensional Stability Testing

Load in Cross direction: 4 kg/10 cm, @200° C. for 10 min

Application of the in the CD allowed determination of the contribution of the binder formulation only, independently of the effect of the reinforcing glass fibers.

TABLE 3

Spunbond Base B

| | Impregnation formulation | | | | | | | Load at Break | | Elongation at break | | Load at 15% elongation | | TDS, load in CD 4 kg, 200° C., 15 min | | TDS, load in Machine Direction, 8 kg, 200° C., 15 min | |
|---|---|---|---|---|---|---|---|---|---|---|---|---|---|---|---|---|---|
| | Latex composition | | | | | | | (N/5 cm) | | (%) | | (N/5 cm) | | % | % | % | % |
| latex ref | Base latex | CoatOsil | latex | Saduren | Xiran | Starch | | MD | CD | MD | CD | MD | CD | elongation | shrinkage | elongation | shrinkage |
| Ex 4 | SRS 1742 | | 90 | | | 10 | | 583 | 460 | 33.3 | 36.6 | 398 | 300 | 6.5% | 7.5% | 0.8% | 1.0% |
| Ex 5 | SRS 1745 | 1.75 | 86 | 4 | | 10 | | 589 | 453 | 29.6 | 35.2 | 423 | 302 | 7.3% | 7.1% | 0.5% | 1.0% |

Results

Reference 5 was a formulation without any crosslinker. It is characterized by poor TDS; i.e. high elongation and shrinkage.

Reference 6 was the state of the art formulation, containing 26 p of a melamine formaldehyde crosslinker. Because of this high content the EH&S risks related to the formaldehyde is of particular concern. In such a case a formaldehyde free crosslinking system is of particular benefit.

Examples 6 and 7 are representative of the crosslinking system of the current embodiments. The TDS performances are much improved compared to the crosslinking free formulation reference 5, demonstrating the crosslinking efficiency of the embodiments. The TDS performances remained slightly lower than for the reference 6 with 26 p of melamine formaldehyde system. This is because the overall amount of crosslinker is much lower; the totals of Xiran and CoatOsil are between 9 p and 14 p, whereas the melamine formaldehyde resin is at 26 p. See Table 4.

Examples 6 and 7 have the further advantage of a significantly higher elongation at break compared to that of reference 6.

TABLE 4

| | | | Melamine formaldehyde resin (Saduren 163) | Styrene Maleci acid copolymer (Xiran 40005) | Epoxysilane (CoatOsil 2287) | load at break (N/5 cm) | elongation at break | TDS-load in CD, 4 kg-10 Min. | |
|---|---|---|---|---|---|---|---|---|---|
| | Latex | Starch | | | | | | % elongation | % shrinkage |
| Ref 5 | XZ 97223: 65p | 35 | | | | 242 | 48.8 | 21.8% | 28.4% |
| Ref 6 | XZ 97223: 39p | 35 | 26 | | | 210 | 28.3 | 14.2% | 8.5% |
| Ex 6 | XZ 97223: 51p | 35 | | 10 | 4 | 229 | 40 | 17.1% | 14.0% |
| Ex 7 | XZ 97223:53p | 35 | | 10 | 2 | 223 | 39.8 | 17.6% | 15.5% |
| Ex 8 | XZ 97223: 59p | 35 | | 6 | 3 | 210 | 38.3 | 18.3% | 16.4% |

Although the present invention has been described with reference to preferred embodiments, persons skilled in the art will recognize that changes may be made in form and detail without departing from the spirit and scope of the invention. All references cited throughout the specification, including those in the background, are incorporated herein in their entirety. Those skilled in the art will recognize, or be able to ascertain, using no more than routine experimentation, many equivalents to specific embodiments of the invention described specifically herein. Such equivalents are intended to be encompassed in the scope of the following claims.

What is claimed is:

1. A formaldehyde free composition consisting of:
    a latex emulsion, wherein the latex emulsion is a polymerization product of one or more of vinylaromatic monomer(s), acrylic acid, methacrylic acid, acrylate monomer(s), methacrylate monomer(s), acrylonitrile, vinyl acetate, ethylene, propylene, acrylamide, methacrylamide, hydroxyalkyl acrylate(s), itaconate(s), fumarate(s), or hydroxyalkyl methacrylate(s);
    an epoxysilane;
    an epoxy dispersion;
    and a polyol;
    wherein the composition does not comprise formaldehyde.

2. The formaldehyde free composition of claim 1, wherein the epoxysilane comprises:

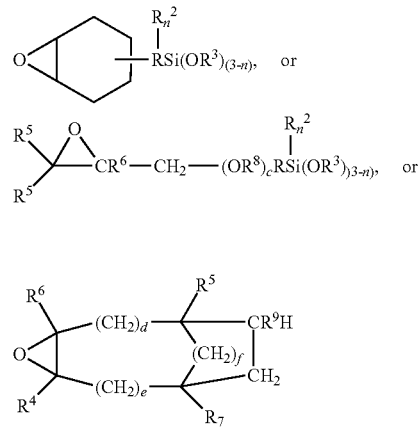

wherein:
    R is $(CH_2)_m$, where m has a value of 0 to 6;
    $R^2$ is a $C_1$-$C_{10}$ alkyl, optionally substituted with a $C_1$-$C_{10}$ alkoxy, or a $C_6$-$C_{10}$ aryl or a $C_7$-$C_{10}$ aralkyl group;
    $R^3$ is a $C_2$-$C_6$ alkyl, optionally substituted with a $C_1$-$C_{10}$ alkoxy, or a $C_6$-$C_{10}$ aryl or a $C_7$-$C_{10}$ aralkyl group;
    $R^4$, $R^5$, $R^6$ and $R^7$ are individually each hydrogen or a $C^1$-$C^6$ alkyl group;
    $R^8$ is a $C_1$-$C_4$ alkylene group or a $C_7$-$C_{10}$ aralkylene or a $C_6$-$C_{10}$ arylene group;
    $R^9$ is $RSi(R_n^2)(OR^3)_{3-n}$;
    n is 0, 1 or 2;
    c, d and e are each independently 0 or 1; and
    f is 0, 1 or 2.

3. The formaldehyde free composition of claim 2, wherein the epoxysilane comprises a glycidoxy silane.

4. The formaldehyde free composition of claim 3, wherein the glycidoxy silane comprises one or more of gamma-glycidoxypropyl trimethoxysilane, gamma-glycidoxypropyl triethoxysilane, gamma-glycidoxypropyl methyldimethoxysilane, or gamma-glycidoxypropyl methyldiethoxysilane.

5. The formaldehyde free composition of claim 2, wherein the epoxysilane comprises beta-(3,4-epoxycyclohexyl)-ethyl trimethoxysilane, beta-(3,4-epoxycyclohexyl)-ethyl methyl dimethoxysilane, beta-(3,4-epoxycyclohexyl)-ethyl methyl diethoxysilane, or beta-(3,4-epoxycyclohexyl)-ethyl triethoxysilane.

6. The formaldehyde free composition of claim 1, wherein the epoxy dispersion comprises an epoxidized bisphenol A novolac resin.

7. The formaldehyde free composition of claim 1, wherein the polyol is starch.

8. The formaldehyde free composition of claim 1, wherein the wt % of the latex is from about 55 wt % to about 95 wt %.

9. The formaldehyde free composition of claim 1, wherein the wt % of the polyol is from about 2 wt % to about 50 wt %.

10. The formaldehyde free composition of claim 1, wherein the wt % of the epoxy silane and the epoxy dispersion is from about 1 wt % to about 10 wt % in total.

* * * * *